(12) United States Patent
Hayashi et al.

(10) Patent No.: US 6,364,396 B1
(45) Date of Patent: Apr. 2, 2002

(54) PACKAGE TRAY FOR VEHICLE

(75) Inventors: Kenichiro Hayashi, Okazaki; Katsura Inoue, Chiryu; Kazuyuki Itaya, Kariya; Noriaki Nakatomi, Aichi-ken, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/691,070

(22) Filed: Oct. 19, 2000

(30) Foreign Application Priority Data

Oct. 19, 1999 (JP) .......................................... 11-297428

(51) Int. Cl.⁷ ................................................. B60J 7/20
(52) U.S. Cl. .................................. 296/136; 296/107.08
(58) Field of Search ............................ 296/136, 107.08

(56) References Cited

U.S. PATENT DOCUMENTS

| 4,687,247 A | * | 8/1987 | Muscat ......................... 296/136 |
| 4,799,729 A | * | 1/1989 | Muscat ......................... 296/136 |
| 5,967,593 A | * | 10/1999 | Schuler et al. ............... 196/136 |
| 6,010,178 A | | 1/2000 | Hahn et al. |
| 6,030,023 A | * | 2/2000 | Guillez ......................... 196/136 |

FOREIGN PATENT DOCUMENTS

| DE | 44 46 483 | 6/1996 |
| FR | 2 747 077 | 10/1997 |
| JP | 8-230484 | 9/1996 |

* cited by examiner

*Primary Examiner*—Joseph D. Pape
*Assistant Examiner*—Jason Morrow
(74) *Attorney, Agent, or Firm*—Burns, Doane, Swecker & Mathis, LLP (57) ABSTRACT

A package tray for a vehicle in which the motion of the sideboards is improved and the raising of the main board and slide board is operated by the same driving source which moves the sideboards. A first output shaft is intermittently operated to move the sideboards from a position adjacent a side of the slide board to a position under the slide board and the main board.

19 Claims, 10 Drawing Sheets

(PRIOR ART)

PACKAGE TRAY FOR VEHICLE

This application is based on and claims priority under 35 U.S.C. § 119 with respect to Japanese Application No. 11(1999)-297428 filed on Oct. 19, 1999, the entire content of which is incorporated herein by reference.

FIELD OF THE INVENTION

This invention generally relates to convertible automobiles. More particularly, the present invention pertains to a package tray for a convertible automobile.

BACKGROUND OF THE INVENTION

A convertible automobile such as an open-air car that is adapted to house a roof panel and a rear window of the automobile in a luggage space is widely known. FIGS. 11(a)–(e) illustrate a sequence of movements involving a roof panel 1, a rear window 2, a package tray 3, and a luggage panel 4 for converting the automobile from the closed top condition shown in FIG. 11(a) to the open top condition shown in FIG. 11(e) to result in an open air car.

Figure 11A:
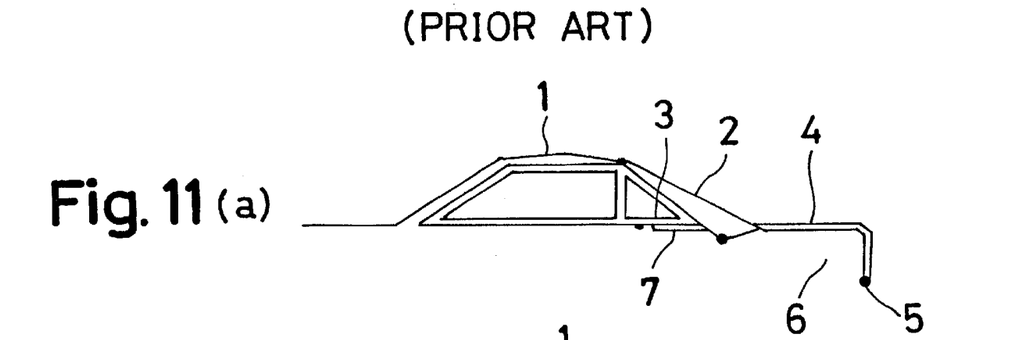
FIGS. 11(a)–(e) are schematic illustrations of the roof assembly illustrating the motion of the package tray and other parts of the assembly and FIGS. 12(a)–(c) are schematic illustrations of the operational sequence associated with portions of the gear box.
Figure 11B:
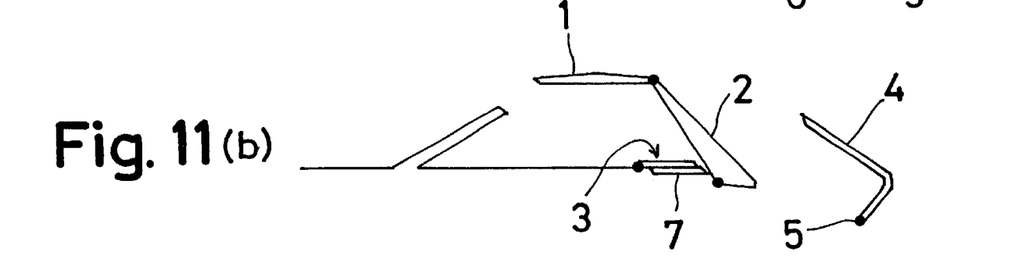

FIG. 11(a) shows the condition of the roof panel 1 and the rear window 2 in the closed position. To convert the vehicle to the open-air condition shown in FIG. 11(e), the rear window 2 is rotated to an upright position and is then pulled or driven downwardly toward the rear direction. The roof panel 1 connected to the rear window 2 is moved in the rearward direction while maintaining the horizontal position. In conjunction with these movements of the roof panel 1 and the rear window 2, the luggage panel 4 is rotated about a pivot axis 5 in the clockwise direction to position the luggage panel 4 in a front open condition shown in FIG. 11(b). Further rearward and downward movement of the rear window 2 could cause interference between the package tray 3 and the rearward moving roof panel 1 if the package tray 3 is maintained in the position shown in FIG. 11(b). Accordingly, the package tray 3 is rotated in the counter-clockwise direction as shown in FIG. 11(c) towards an upright position to avoid such interference between the package tray 3 and the roof panel 1.

Figure 11C:
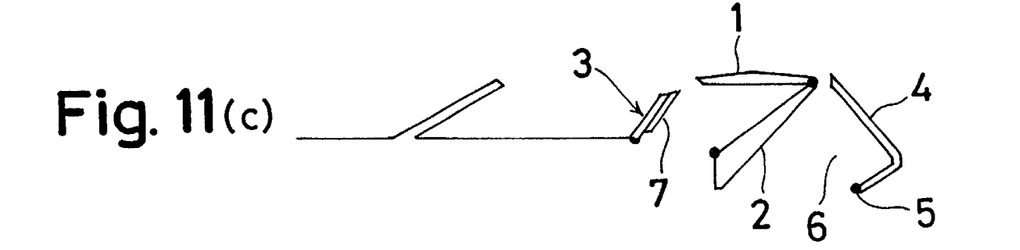
Figure 11D:
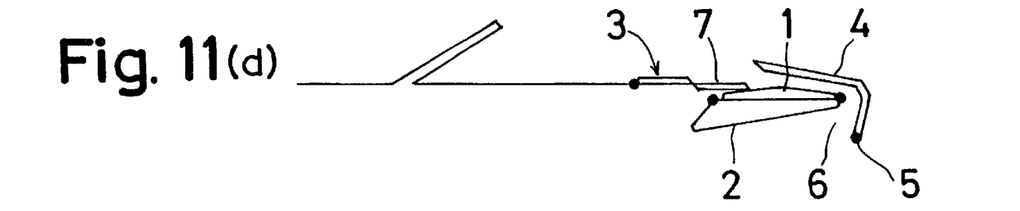
Figure 11E:
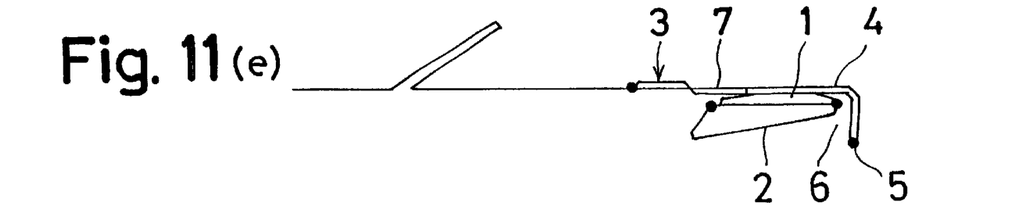

In the condition shown in FIG. 11(c), the roof panel 1 and the rear window 2 are partially housed in the luggage space or trunk 6. Further rearward and downward movement of the rear window 2 causes the roof panel 1 and the rear window 2 to reach the condition shown in FIG. 11(d) in which the roof panel 1 and the rear window 2 are completely housed in the luggage space 6. As shown in FIG. 11(d), a slide board portion 7 of the package tray 3 is pulled or moved in the rearward direction. After confirming the complete housing of the roof panel 1 and the rear window 2 in the luggage space 6, the luggage panel 4 is pivoted counter-clockwise and completely closed as illustrated in FIG. 11(e).

To move the roof panel from the completely open condition to the completely closed condition, a reverse order of movements to that described above is carried out. To place luggage in the luggage space 6 when the roof assembly is in the completely closed condition shown in FIG. 11(a), the lock associated with the luggage panel 4 is unlocked and the rear portion of the luggage panel 4 is lifted by hand. When the roof panel is either entirely opened or completely closed, the package tray 3 closes an opening between the front brim of the luggage panel and the vehicle body so as to cover and not reveal or expose the luggage space.

Japanese Patent Laid-Open Publication No. H08-230484 (published on Sep. 10, 1996) describes the movement or motion of the roof panel and the luggage panel, while German Patent Specification No. DE 4446483 discloses the movement or motion of the package tray.

Known package trays are disclosed in French Patent Specification No. 2747077 (corresponding to a Japan Patent Laid-Open Publication H10-58984) and German Patent Specification No. DE 4446483. The French Patent Specification describes a slide board slidable relative to a main board and a pair of side boards provided on both sides of the main board. When the roof panel is completely closed, the side board stands upright while rocking in the upward direction. The German Patent Specification describes a slide panel slidable relative to a main board and sideboards on both sides of the main board. When the roof panel is completely closed, the side boards are housed on the main board.

The above-referenced devices suffer from certain disadvantages and drawbacks. The technical mechanisms adopted in these known devices such as the sideboards that rock in the upward and downward directions or the sideboards that are housed on the main board are not attractive in appearance. In addition, when the occupant or the luggage contacts the sideboards on the main board, because they are located outside of the vehicle, the sideboards may be damaged.

A need thus exists for a package tray for a convertible-type vehicle that is not as susceptible to the same disadvantages and drawbacks as those mentioned above A need also exists for a package tray for a vehicle in which the motion of sideboards is improved and the rise of a main board is operated by the same driving source.

SUMMARY OF THE INVENTION

In accordance with the present invention, upon movement of the roof panel from the entirely opened condition to the completely closed condition, the sideboards of the package tray move inwardly towards the inside of the vehicle to a position located under the slide board. This can be accomplished by moving the main board and the slide board to a generally upright position, rotating the sideboards about a pivot axis to the position under the slide board, and moving the main board and the slide board connected thereto to a generally horizontal position so that the sideboards are covered by the main board when the roof panel is entirely closed.

According to one aspect of the invention, the package tray includes the main board disposed in the front portion of a storage space and movable to a generally upright position, the slide board being slidable relative to the main board, and a pair of sideboards positioned on the sides of the main board when the roof panel is entirely opened and positioned under the main board and the slide board when the roof panel is completely closed.

Another aspect of the invention involves a package tray assembly mounted on a vehicle having a roof panel movable between an entirely opened condition in which the roof panel is housed in a storage space of the vehicle and a completely closed condition. The package tray assembly includes a main board positioned on a front portion of the storage space, a slide board slidably movable in a longitudinal direction relative to the main board, at least one sideboard movable between an extended position adjacent a side of the slide board and a retracted position underneath the slide board, and a driving mechanism operatively associated with the at least one sideboard to move the at least one sideboard from the extended position to the retracted position in cooperation with movement of the roof panel between the entirely open position and the completely closed position.

Another aspect of the invention involves a method of operating a package tray mounted on a vehicle having a roof panel that is movable between an entirely opened position in which the roof panel is housed in a storage space of the vehicle and a completely closed position. The method includes moving a side board of the package tray from an extended position adjacent a side of a slide board to a retracted position under the slide board in cooperation with movement of the roof panel from the entirely opened position towards the completely closed position.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
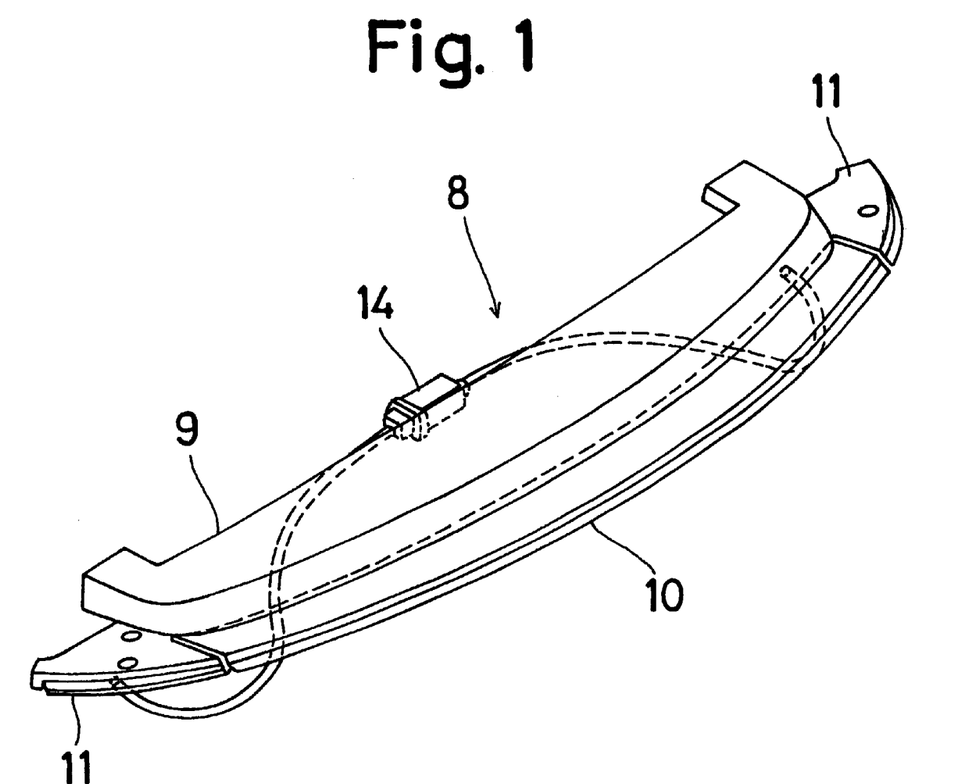
FIG. 1 is a perspective view of a package tray when the roof panel is entirely opened.

The present invention provides a package tray assembly that includes a package tray and a drive mechanism operatively connected to the package tray to effect movement of the package tray in the manner described below in more detail. Referring initially to FIGS. 1–5, the package tray 8 for a vehicle in accordance with the present invention includes a main board 9, a slide board 10 slidable in the vehicle longitudinal direction, and a pair of sideboards 11 each positionable at one side of the slide board 10 as shown in FIG. 1 and movable to a position located under the slide board 10 and under the main board 9 as shown in FIGS. 3 and 4. The movement of the slide board 10 involves the slide board 10 being moved to extend out beyond the main board 9 or to be retracted underneath the main board 9.

Figure 2:
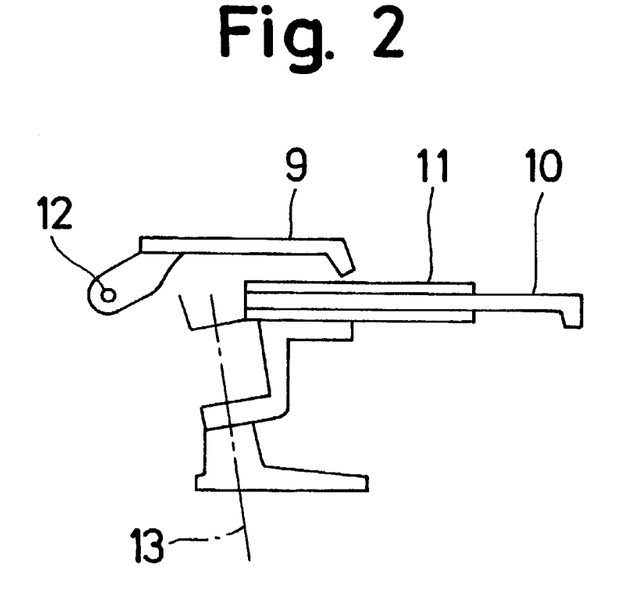
FIG. 2 is a side view of the package tray shown in FIG. 1.
Figure 3:
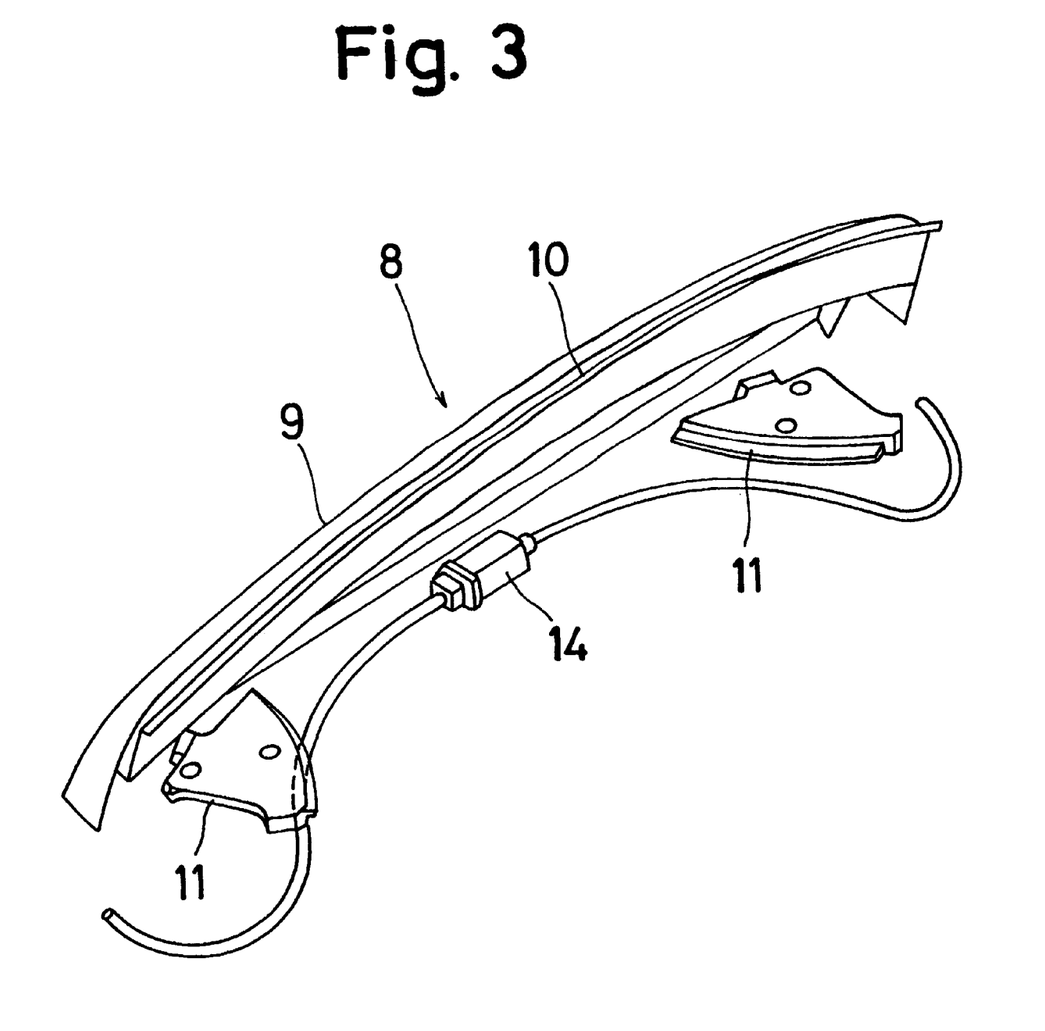
FIG. 3 is a perspective view of the package tray shown in FIG. 1 illustrating the rising condition of the main board.
Figure 4:
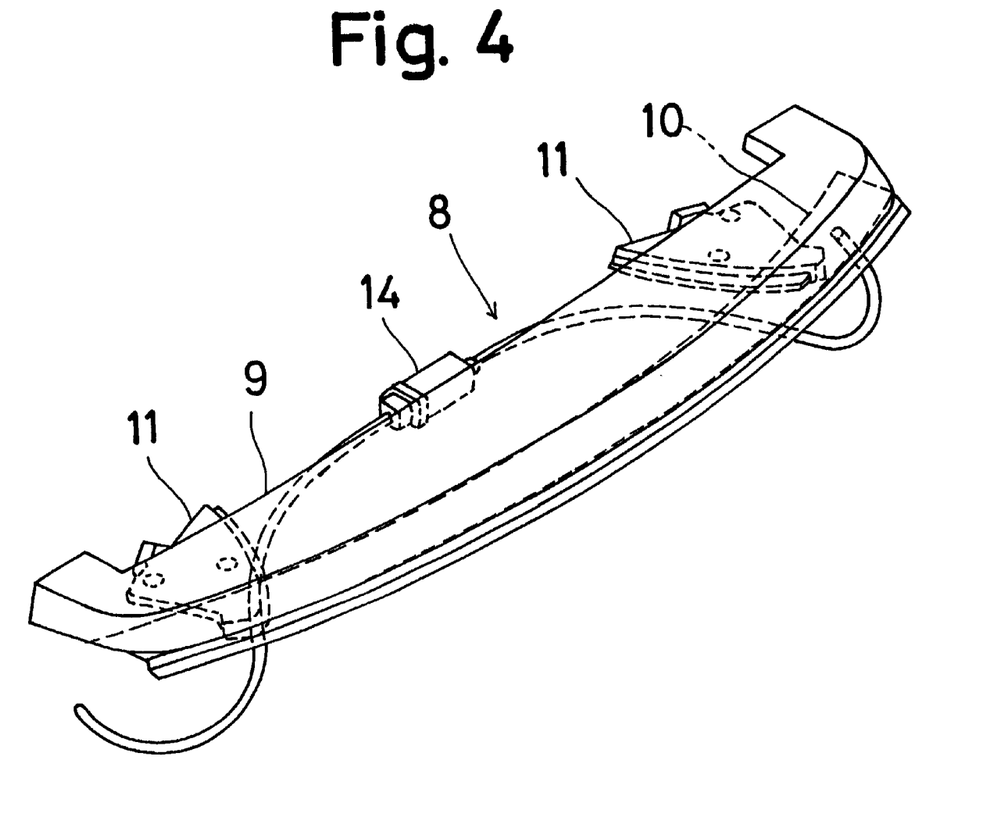
FIG. 4 is a perspective view of the package tray shown in FIG. 1 when the roof panel is completely closed.
Figure 5:
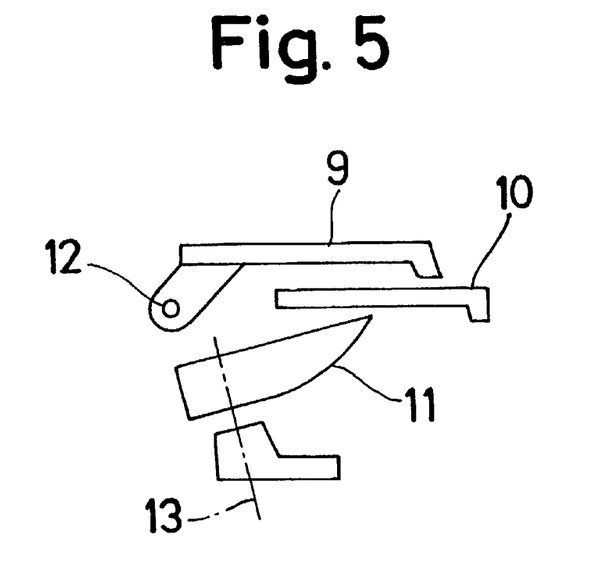
FIG. 5 is side view of the package tray shown in FIG. 4.

The main board 9 and the slide board 10 are adapted to be integrally rotated as a unit about a first pivot axis 12 for movement between a generally horizontal position as shown in FIGS. 1 and 2, and a generally upright position shown in FIG. 3. That is, when the roof panel is moved from the entirely opened condition to the completely closed condition, the main board 9 and the slide board 10 are rotated in the counterclockwise direction with reference to the FIG. 3 illustration to be positioned in the generally upright position. In conjunction with this movement of the main board 9 and the slide board 10 to the generally upright position, the sideboards 11 are rotated around a second pivot axis 13 towards the inner direction of the vehicle and towards one another. The main board 9 and the slide board 10 are then returned to the generally horizontal position as shown in FIGS. 4 and 5 after confirming that the sideboards 11 are housed in the inside of the vehicle at a position under the slide board 10 and the main board 9. In this condition, the sideboards 11 are covered by the main board 9 and the slide board 10 as shown in FIGS. 4 and 5.

Figure 6:
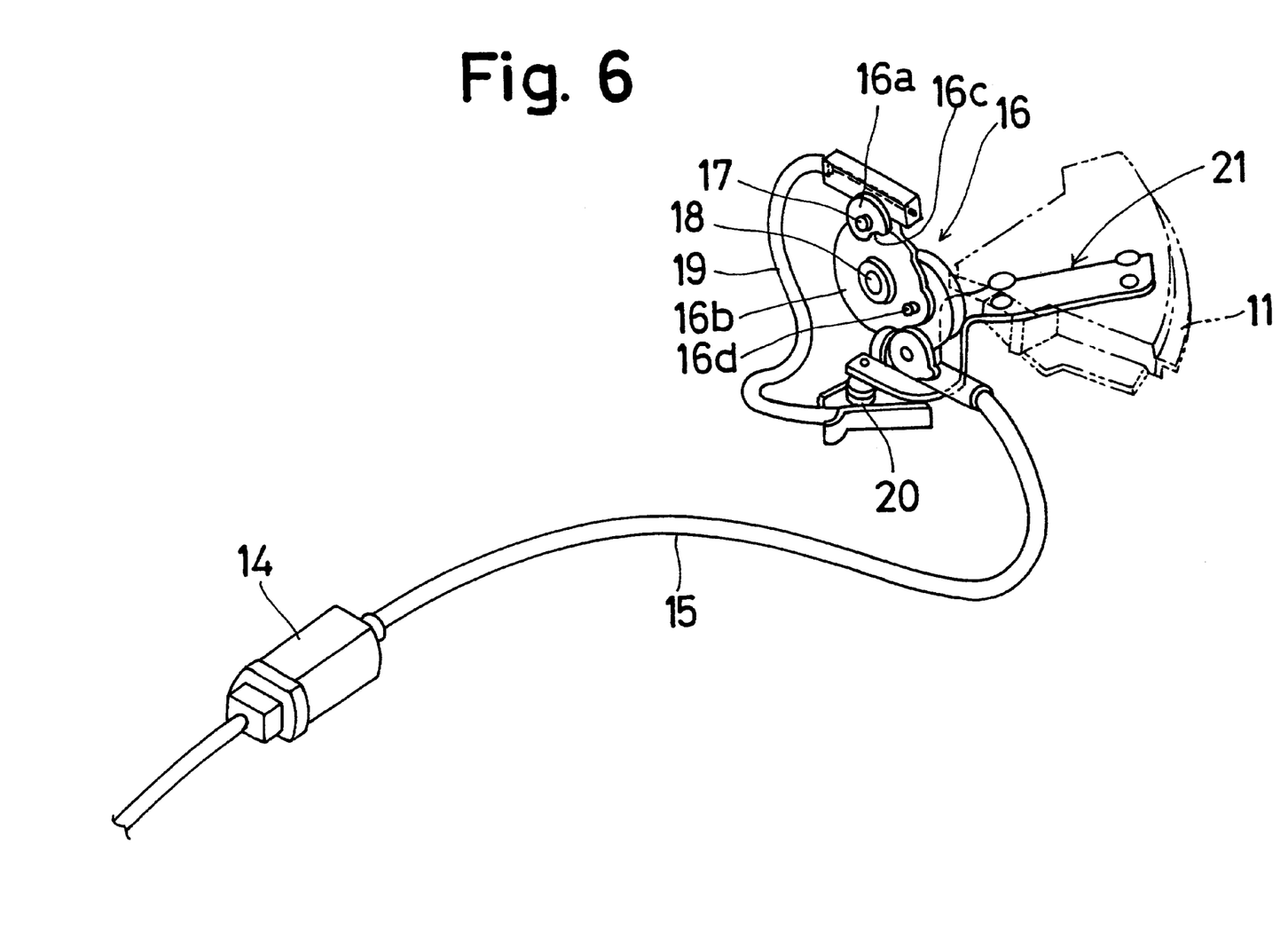
FIG. 6 is a perspective view of the gear box and sideboards used in the package tray.

The slide board 10 and the sideboard 11 are intermittently operated or driven by a motor 14 provided in the central portion of the vehicle. Referring to FIG. 6, the output of the motor 14 is transmitted to a gear box 16 via a first geared cable 15. The gear box 16 includes a worm gear, a worm wheel, and a plane gear. A first output shaft 17 and a second output shaft 18 transmit intermittent output over a necessary interval. The first output shaft 17 is connected to a drive gear 20 via a second geared cable 19, and the rotational torque of the first output shaft 17 is transmitted to the drive gear 20. The drive gear 20 is fixed to a swing arm 21. The swing arm 21 includes a horizontal portion supporting the sideboard 11 and a stepped portion extending downwardly from the horizontal portion and fixed to the drive gear 20.

Figure 7:
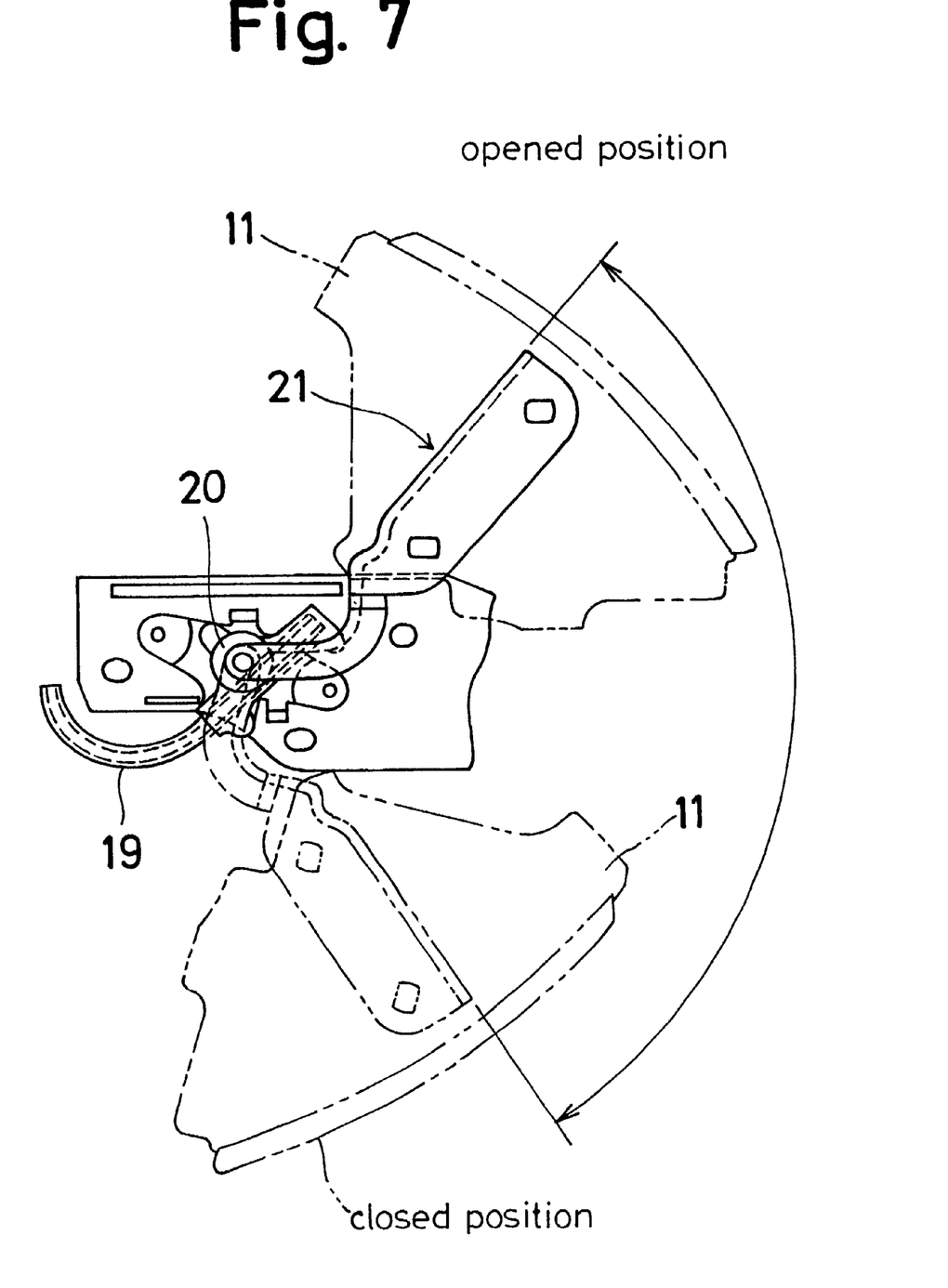
FIG. 7 is a plane view illustrating the driving portion of the sideboards.

The first output shaft 17 transmits the intermittent output to the drive gear 20 to provide the necessary rotating motion for the sideboard 11 to rotate the sideboard 11 inwardly and outwardly as shown in FIG. 7. The second output shaft 18 transmits output to move the main board 9 and the slide board 10.

Figure 12A:
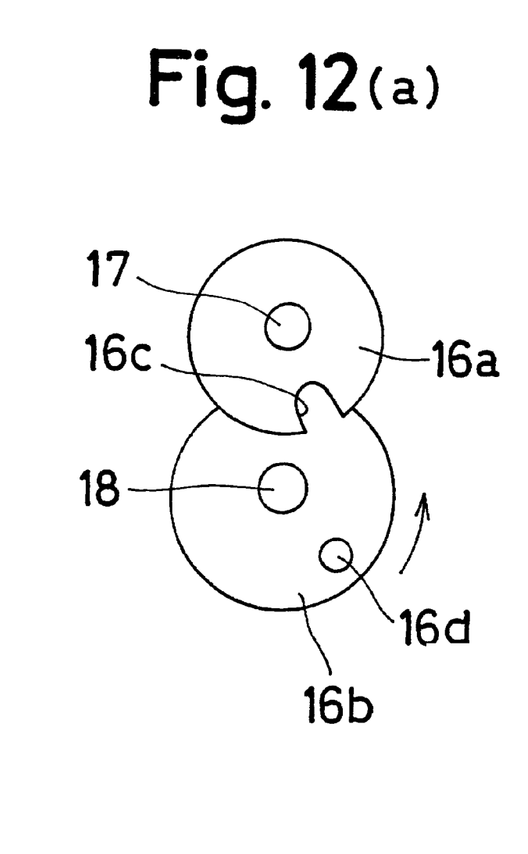
Figure 12B:
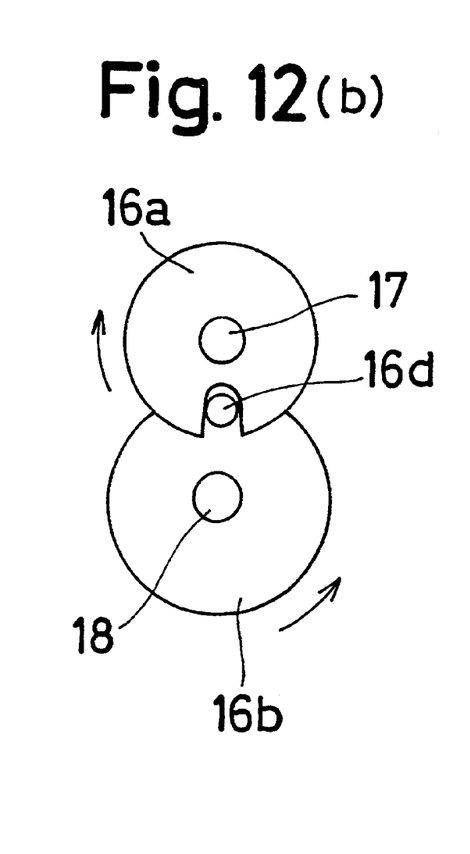
Figure 12C:
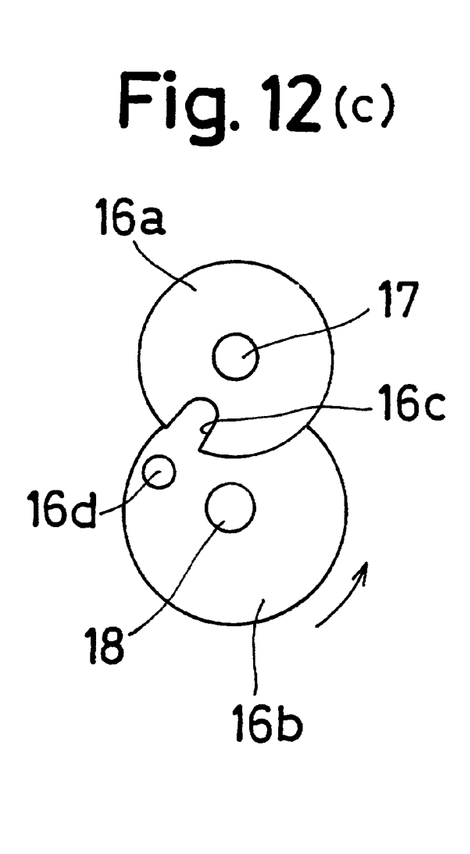

Referring to FIG. 6 generally and FIGS. 12(a)–(c) more specifically, the gear box 16 also includes a first disc 16a having a groove 16c and a second disc 16b having a pin 16d. The first disc 16a is connected to the first output shaft 17 so that the first disc 16a integrally rotates with the first output shaft 17. The second disc 16b is connected to the second output shaft 18 so that the second disc 16b integrally rotates with the second output shaft 18. The pin 16d of the second disc 16b is adapted to be engaged with and disengaged from the groove 16c of the first disc 16a. When the motor 14 is initially operated to drive the second output shaft 18, the second disc 16b is rotated. That is, the motor output is transferred to the second shaft 18 by way of gear box components to thus rotate the second shaft 18 and the second disk 16b. The pin 16d of the second disc 16b engages the groove 16c of the first disc 16a by the rotation of the second disc 16b. Then, the first disc 16a starts rotating. As a result, the first output shaft 17 is driven by the rotation of the first disc 16a, but the drive or rotation of the first output shaft 17 is delayed from when the second output shaft 18 starts rotating or driving as shown in FIGS. 12(a)–(c). With this operation, the movement of the sideboard 11 is synchronized with the movement of the slide board 10 to carry out the movement sequence generally described above and more specifically described below.

Figure 8:
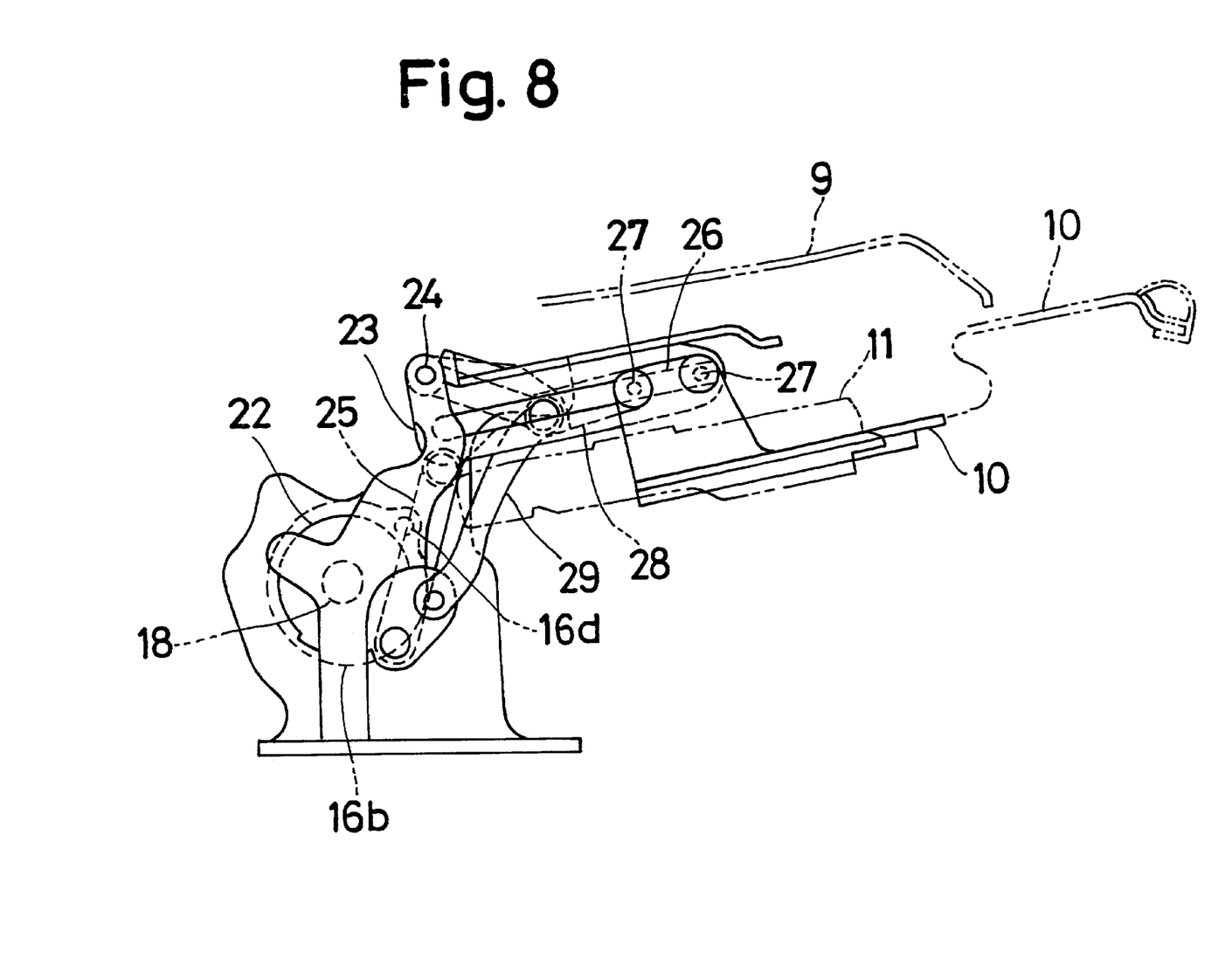
FIG. 8 is a side view of the package tray when the roof panel is entirely opened.

The mechanism for effecting motion or movement of the main board 9 and the slide board 10 is as follows. As shown in FIG. 8, a rotation plate 22 is fixed to the second output shaft 18. The rotation plate 22 is arranged behind the second disk 16b in the FIG. 6 illustration. A bracket 23 is rotatably supported by a fixed member on the vehicle body with a pin 24. The rotation plate 22 and the bracket 23 are connected by a link 25, and the main board 9 is supported by the bracket 23.

The bracket 23 includes an elongated hole 26 extending in the longitudinal direction. Two separately provided pins 27, 27 are positioned in the elongated hole 26 for supporting the slide board 10. The slide board 10 slidably moves relative to the main board 9 within a range of movement defined by the stroke of the pins 27, 27 sliding within the elongated hole 26.

One end of a second link 28 is engaged with one of the pins 27 and the other end of the second link 28 is connected to a third link 29. One end of the third link 29 is pivotally supported by the rotation plate 22. The first link 25 and the third link 29 (which is longer than the first link 25) are provided on the front and the reverse sides respectively of the rotation plate 22. The first link 25 and the third link 29 are movable and able to cross over each other.

It is to be understood that the illustration shown in FIG. 6 represents the mechanism provided adjacent one side of the package tray for moving the package tray 11 located on the one side of the slide board 10 and for effecting the movement of the main board 9 and the slide board 10 as described in more detail below. A similar mechanism driven by the same motor 14 shown in FIG. 6 is provided on the opposite side of the package tray for moving the package tray 11 located on that side of the slide board 10 and for effecting the movement of the main board 9 and the slide board 10.

FIG. 8 shows the position of the package tray 8 when the roof panel is entirely opened in the open-air condition (i.e., when the roof panel is positioned as shown in FIG. 11(e)). The slide board 10 extends outwardly from the main board 9 beyond the front edge of the main board 9, and the sideboards 11 are positioned at the opposite sides of the slide board 10 in the manner shown in FIG. 1.

Figure 9:
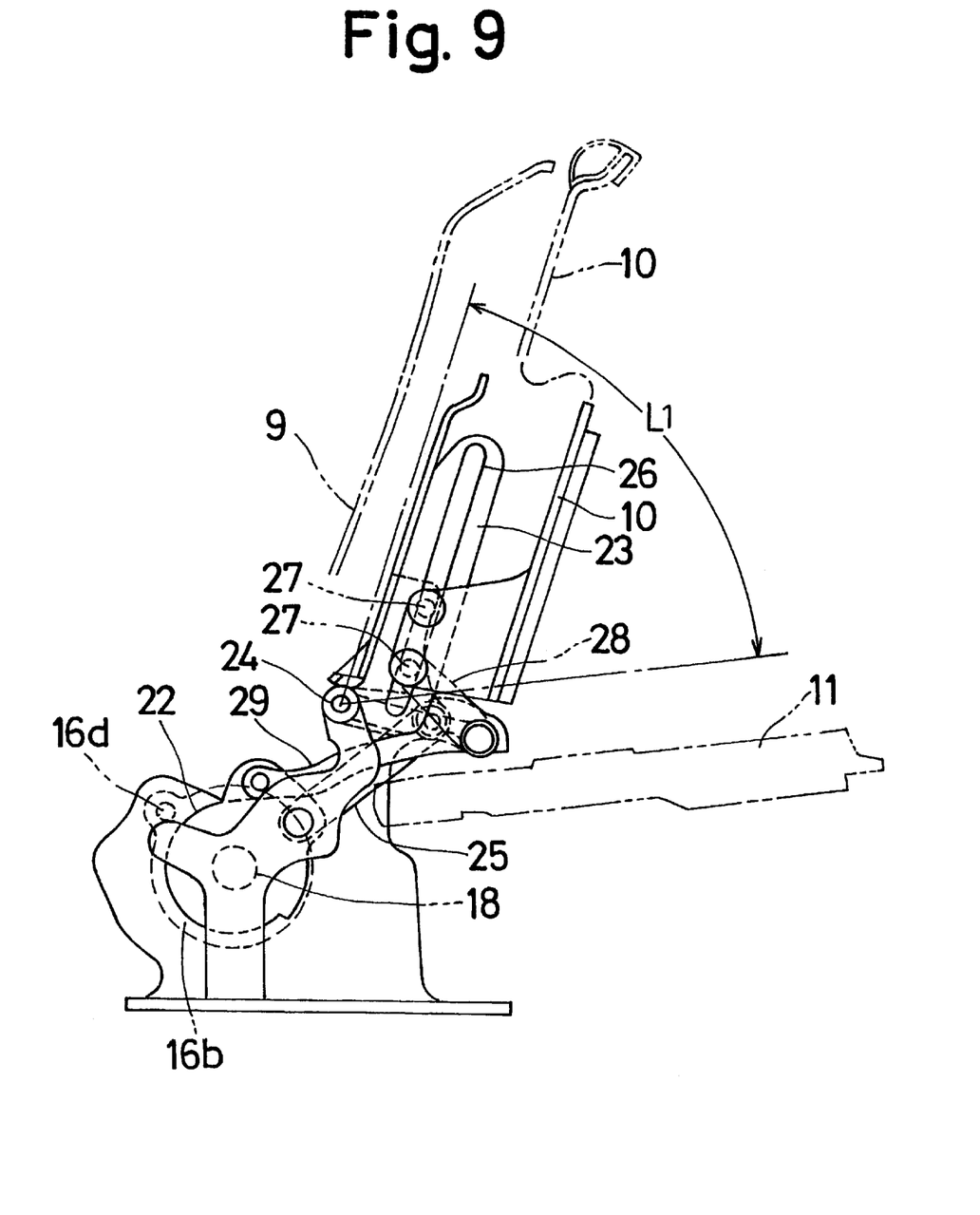
FIG. 9 is a side view illustrating the rising condition of the package tray.

The motor 14 is operated to cause rotation of the second output shaft 18 and thus the rotation plate 22 and the second disk 16b. By virtue of the rotation of the rotation plate 22, the link 25 rotates the bracket 23 around the pin 24 in the counterclockwise direction in FIG. 8, and the main board 9 and the slide board 10 move as one unit to a generally upright position as shown in FIG. 11(c), FIG. 3 and FIG. 9. Through the rotation of the rotation plate 22 and accordingly the bracket 23, the third link 29 pulls the second link 28 towards the first link 25 and the slide board 10 slidably moves to a retracted position under the main board 9.

As illustrated in FIG. 9, a operation space L1 forming an angle of about 65 to 70 degrees is thus provided to allow the sideboards 11 to move inward towards the inside of the vehicle and towards each other.

Under the condition shown in FIG. 9, the first output shaft 17 is driven to move the sideboards 11 in the manner shown in FIG. 7. That is, the driving operation of the first output shaft 17, caused by engagement of the pin 16d on the second disk 16b with the groove 16c on the first disk 16a, moves the sideboards 11 inwardly from the opened position (i.e., outwardly extended position) to the closed position (i.e., inwardly extended position). After completion of the movement of the sideboards 11, the actuation of the first output shaft 17 is stopped.

Figure 10:
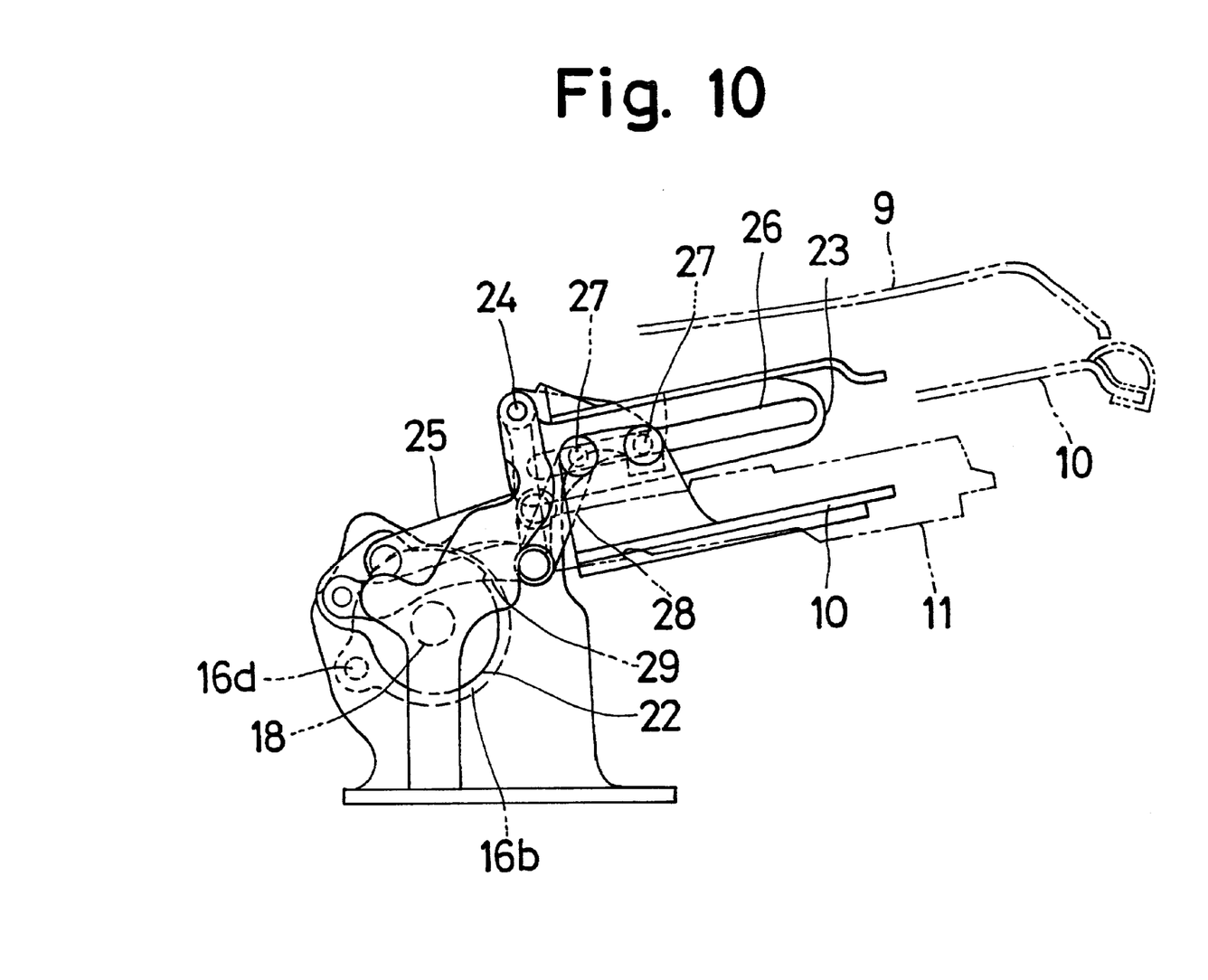
FIG. 10 is a side view of the package tray when the roof panel is completely closed.

Further rotation of the rotation plate 22 moves the main board 9 and the slide board 10 downwardly from the generally upright position to a generally horizontal position to cover the front portion of the luggage space. This position of the package tray is represented in FIG. 4. Also, FIG. 10 shows the condition of the package tray when the roof panel is completely closed (i.e., when the roof panel is positioned as shown in FIG. 11(a)). Here, the slide board 10 is positioned under the main board 9 and the sideboards 11 are disposed under the slide board 10 and the main board 9.

The operation of the main board 9, the slide board 10, and the sideboards 11 when the roof panel moves from the completely closed condition to the entirely opened condition is the reverse of the operational steps described above.

By virtue of the present invention, the package tray is relatively attractive in appearance and the sideboards are not as susceptible to becoming damaged.

The principles, preferred embodiments and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A package tray for a vehicle having a roof panel movable between an entirely opened condition in which the roof panel is housed in a storage space of the vehicle and a completely closed condition comprising:
   a main board adapted to be positioned on a front portion of the storage space and movable to a generally upright position;
   a slide board slidably movable in a longitudinal direction relative to the main board; and
   a pair of movable sideboards positionable on opposite sides of the main board when the roof panel is in the entirely opened condition and positionable under the main board and the slide board when the roof panel is in the completely closed condition.

2. The package tray for a vehicle according to claim 1, wherein each of the sideboards is fixed to a swing arm, said swing arm being connected to a drive gear engaged with a geared cable, said geared cable engaging a first output shaft of a gear box driven by an electric motor, with intermittent output operation of the first output shaft of the electric motor causing the sideboards to move under the main board and the slide board.

3. The package tray for a vehicle according to claim 2, wherein the swing arm includes a horizontal portion supporting the sideboard and a stepped portion positioned downwardly from the horizontal portion and connected to the drive gear.

4. A package tray for vehicle according to claim 2, including a rotation plate fixed to a second output shaft of the gear box, a bracket pivotally supported by a fixed member of the vehicle and supporting the main board, a first link connecting the bracket and the rotation plate, a pair of pins inserted into an elongated hole provided in the bracket and supporting the slide board, a second link having one end portion pivotally supported by one of the pins and another end portion connected to the rotation plate by a third link.

5. A package tray assembly mounted on a vehicle having a roof panel movable between an entirely opened condition in which the roof panel is housed in a storage space of the vehicle and a completely closed condition, comprising:
   a main board positioned on a front portion of the storage space;
   a slide board slidably movable in a longitudinal direction relative to the main board;
   at least one sideboard movable between an extended position adjacent a side of the slide board and a retracted position underneath the slide board; and a driving mechanism operatively associated with the at least one sideboard to move the at least one sideboard from the extended position to the retracted position in cooperation with movement of the roof panel between the entirely open position and the completely closed position.

6. The package tray assembly for a vehicle according to claim 5, wherein the drive mechanism includes a swing arm on which is mounted the at least one sideboard, the swing arm being connected to a drive gear engaged with a geared cable, said geared cable engaging a first output shaft of a gear box driven by an electric motor, with intermittent output operation of the first output shaft causing the sideboards to move to the retracted position.

7. The package tray assembly for a vehicle according to claim 6, wherein the swing arm includes a horizontal portion supporting the at least one sideboard and a stepped portion positioned downwardly from the horizontal portion and connected to the drive gear.

8. The package tray assembly for vehicle according to claim 6, including a rotation plate fixed to a second output shaft of the gear box, a bracket pivotally supported by a fixed member of the vehicle and supporting the main board, a first link connecting the bracket and the rotation plate, a pair of pins inserted into an elongated hole provided in the bracket and supporting the slide board, a second link having one end portion pivotally supported by one of the pins and another end portion connected to the rotation plate by a third link.

9. The package tray assembly for vehicle according to claim 5, wherein the drive mechanism is operatively connected to the slide board and the main board to rotate the main board and the slide board between a generally horizontal position and a generally upright position.

10. A method of operating a package tray mounted on a vehicle having a roof panel that is movable between an entirely opened position in which the roof panel is housed in a storage space of the vehicle and a completely closed position, the package tray including a main board, a slide board and a sideboard, the method comprising:

moving the sideboard of the package tray from an extended position adjacent a side of the slide board to a retracted position under the slide board in cooperation with movement of the roof panel from the entirely opened position towards the completely closed position; and slidably retracting the slide board relative to the main board from an extended position in which at least a portion of the slide board extends beyond a front edge of the main board.

11. A method of operating a package tray mounted on a vehicle having a roof panel that is movable between an entirely opened position in which the roof panel is housed in a storage space of the vehicle and a completely closed position, comprising:

moving a sideboard of the package tray from an extended position adjacent a side of a slide board to a retracted position under the slide board in cooperation with movement of the roof panel from the entirely opened position towards the completely closed position, wherein the package tray includes a main board overlying the slide board, and including slidably moving the slide board relative to the main board from an extended position in which a portion of the slide board extends out beyond an edge of the main board to a position in which the slide board is retracted from the extended position of the slide board.

12. A method of operating a package tray mounted on a vehicle having a roof panel that is movable between an entirely opened position in which the roof panel is housed in a storage space of the vehicle and a completely closed position, comprising:

moving a sideboard of the package tray from an extended position adjacent a side of a slide board to a retracted position under the slide board in cooperation with movement of the roof panel from the entirely opened position towards the completely closed position, wherein the package tray includes a main board overlying the slide board, and including raising the main board and the slide board from a generally horizontal position to a generally upright position before moving the sideboard from the extended position to the retracted position.

13. The method according to claim 12, wherein the main board and the slide board are raised by operation of a motor, the operation of the motor also causing the sideboard to move from the extended position to the retracted position.

14. The method according to claim 12, including lowering the main board and the slide board from the generally upright position to the generally horizontal position after moving the sideboard from the extended position to the retracted position.

15. The method according to claim 11, including raising the main board and the slide board together from a generally horizontal position toward a generally upright position.

16. The method according to claim 11, wherein the sideboard is a first sideboard located adjacent one side of the slide board, and including a second sideboard movable from an extended position adjacent an opposite side of slide board to a retracted position under the slide board in cooperation with movement of the roof panel from the entirely opened position towards the completely closed position.

17. The method according to claim 10, including moving the main board and the slide board together towards a generally upright position, the slide board being slidably retracted during movement of the main board and the slide board towards the generally upright position.

18. The method according to claim 17, including lowering the main board and the slide board from the generally upright position towards a generally horizontal position after moving the sideboard from the extended position to the retracted position.

19. The method according to claim 10, including raising the main board and the slide board towards a generally upright position through operation of a motor, the operation of the motor also causing the sideboard to move from the extended position to the retracted position.

* * * * *